United States Patent [19]

Momiyama

[11] Patent Number: 5,759,608
[45] Date of Patent: Jun. 2, 1998

[54] METHOD OF MANUFACTURING INSTANT NOODLE STRIP HAVING GOOD RECONSTITUTING PROPERTY

[75] Inventor: Yasuo Momiyama, Kashiwa, Japan

[73] Assignee: Sanyo Shokuhin Co., Ltd., Tokyo, Japan

[21] Appl. No.: 615,512

[22] Filed: Mar. 13, 1996

[30] Foreign Application Priority Data

May 18, 1995 [JP] Japan .................. 7-142440

[51] Int. Cl.$^6$ ........................................ A23L 1/16
[52] U.S. Cl. ................ 426/557; 426/144; 426/451; 426/502; 426/503; 425/290; 425/363
[58] Field of Search ............... 426/502, 503, 426/518, 557, 451, 144; D1/126; 425/290, 363

[56] References Cited

U.S. PATENT DOCUMENTS

| D. 67,351 | 5/1925 | Ranucci | D1/126 |
|---|---|---|---|
| D. 96,161 | 7/1935 | Cirillo | D1/126 |
| D. 248,256 | 6/1978 | Pollano | D1/126 |
| D. 311,625 | 10/1990 | Starck | D1/126 |
| D. 311,629 | 10/1990 | Ragot | D1/126 |
| 4,780,329 | 10/1988 | D'Alterio | 426/144 |
| 4,816,281 | 3/1989 | Moriyama et al. | 426/144 |

OTHER PUBLICATIONS

Good Housekeeping, Feb. 1980.
Foods of the World, The Cooking of Italy, 1968.
Encyclopedia of Food, 1923.

Primary Examiner—Lien Tran
Attorney, Agent, or Firm—Varndell Legal Group

[57] ABSTRACT

Non-fried instant noodles are manufactured by kneading wheat flour together with water or water containing additives to form a dough, rolling the dough by a rolling device to form a dough sheet, passing the dough sheet between molding rolls having a plurality of pyramid-shaped protrusions formed thereon to form pyramid-shaped recesses in rolled surfaces of the dough sheet, cutting the dough sheet into a plurality of strips such that each of the strips has formed therein at least one row of pyramid-shaped recesses aligned in a longitudinal direction of the strip, boiling the instant noodle strips with steam, and drying the boiled noodle strips with hot air. The thus obtained oil-free instant noodles have superior reconstituting property and transparent appearance, and can give smooth and soft chewiness. Further, the instant noodles are well matched with soup.

8 Claims, 7 Drawing Sheets

METHOD OF MANUFACTURING INSTANT NOODLE STRIP HAVING GOOD RECONSTITUTING PROPERTY

BACKGROUND OF THE INVENTION

1. Field of the Invention

The present invention relates to instant noodle strips and a method and an apparatus of manufacturing instant noodle strips by rolling a dough to form a dough sheet and cutting the dough sheet into noodle strips by a cutting means, and more particularly relates to non-fried instant noodle strips having good reconstituting property and a method and an apparatus of manufacturing such instant noodle strips.

2. Related Art Statement

In order to improve the reconstituting property of dry noodles and the like, there have been proposed various methods. In particular, in a field of the instant noodles requiring easy preparation, various improvements have been developed. Recently, the consumers have required not only easy preparation but also the taste and chewiness of ordinary fresh noodles or hand-made noodles. During the steps of developing the present invention, the inventors have tried to realize instant noodles with the feeling of hand-made noodles required by the consumers by utilizing a process of manufacturing non-fried noodles which have similar taste and chewiness of fresh noodles as compared with fried noodles which have been mainly used for instant noodles. In general, non-fried noodles are dried by hot air, and thus it is difficult to obtain porous microstructure. This results in that the non-fried noodles could not be easily reconstituted into a tasty edible state and a relatively long preparation time is required as compared with the fried noodles. In case of an instant cup noodle in which noodles are reconstituted merely by adding hot water, the noodles could not be thickened, and therefore fulfilled satisfaction could not be attained. Further, noodles could not match with a soup well, so that the consumers get bored with the taste and the chewiness.

In order to attain a good reconstitution, there have been developed methods of manufacturing instant noodles including a drying step by utilizing microwave drying and superheated steam drying instead of hot air drying. For instance, in Japanese Patent Publication No. 56-35132, there is disclosed a method of manufacturing non-fried instant noodles by using the microwave drying. In Japanese Patent Publication No. 63-56787, there is described a method of manufacturing instant noodles by using the superheated steam drying. By using the microwave drying and superheated steam drying, the microstructure of noodles becomes porous and it is possible to obtain the reconstitution similar to the fried noodles. However, noodles manufactured by the microwave drying and superheated steam drying have another problem that the appearance of transparency and smoothness of fresh noodles could not be obtained.

Further proposed methods of manufacturing instant noodles with good reconstitution as follows:

(1) On a surface of a noodle there are formed wedge-shaped ditches extending toward a center of the noodle to improve water permeation during boiling and shorten reconstituting time. (Japanese Patent Publication No. 4-69984)

(2) A dough sheet is cut into strips, and each of the strips is simultaneously pressed in a direction perpendicular to the rolled surfaces to form a longitudinal recess in one surface and a longitudinal protrusion in the other surface. (Japanese Utility Model Publication No. 63-27597)

(3) Cut out portions are formed in a surface of a strip with the aid of cutting rolls. (Japanese Utility Model Publication No. 6-61086)

In the above mentioned known method (1), the wedge-shaped ditch is formed by using a specially designed die, so that this method can be applied only to pasta such as spaghetti and macaroni. Further, the noodle strips are manufactured by extrusion molding under pressure, so that their microstructure is liable to be dense. Such noodle strips could be hardly applied to the cup noodles in which the dried noodles have to be reconstituted with hot water in about three minutes.

In the above explained methods (2) and (3), although the reconstitution of instant noodles could be improved, these methods are restricted to noodles having rectangular cross sectional configuration. Moreover, the cut-out portion makes the appearance of the noodles un and makes a feeling to a tongue rough.

In this manner, the known methods could not manufacture instant noodles that would give fulfilled satisfaction though they improved reconstituting property and improved soup matching property without losing the appearance and feeling to the tongue.

The inventors of the present application conducted various experiments and studies for solving the above explained problems, and deduced an idea that the reconstituting and soup matching properties could be improved by forming holes in noodle strips. To this end, prior to cutting a dough sheet into strips, there was arranged a roll having needles embedded therein in radial directions. By passing the dough sheet through such a needle roll, there were formed a number of small holes in the dough sheet. After cutting the thus treated dough sheet into noodle strips, they were steamed and dried with hot air to manufacture instant noodles.

However, it was found that the reconstitution could not be sufficiently improved due to a fact that the dough sheet had elasticity so that the small holes were soon closed. Furthermore, when a rotational speed of the needle roll was increased, the dough sheet material was liable to stick onto the roll between needles, and finally the roll was completely covered with the dough sheet material. In this manner, this method was found not to be practically applied.

SUMMARY OF THE INVENTION

An object of the present invention is to provide novel and improved instant noodles having improved reconstitution, appearance, chewiness and soup matching.

According to the invention, an instant noodle strip formed by a cutting step comprises one or more rows of pyramid-shaped recesses with four triangle faces formed in at least one of two rolled surfaces situating between cut side surfaces, said recesses being separated from one another by a desired distance.

According to the invention, it is preferable to form said pyramid-shaped recess such that a vertical angle of an isosceles triangle formed by a vertical cross section passing through a top of the pyramid-shaped recess in a longitudinal direction of the noodle strip is set to an angle within a range from 45 degrees to 90 degrees.

According to the invention, a method of manufacturing instant noodle strips comprises the steps of:

kneading wheat flour together with water or water containing additives to form a dough:

rolling the dough to form a dough sheet;

passing the dough sheet between molding rolls, at least one of which has formed thereon a plurality of pyramid-shaped protrusions to form pyramid-shaped recesses with four triangle faces in at least one of two rolled surfaces of the dough sheet; and cutting the dough sheet into a plurality of strips such that each of the strips has formed therein at least one row of pyramid-shaped recesses aligned in the longitudinal direction of the strip.

According to the invention, an apparatus of manufacturing instant noodle strips comprises, means for kneading wheat flour together with water or water containing additives to form a dough;

means for rolling the dough to form a dough sheet;

means for forming pyramid-shaped recesses with four triangle faces in at least one of two rolled surfaces of the dough sheet; and means for cutting the dough sheet into a plurality of strips such that each of the strips has formed therein at least one row of pyramid-shaped recesses with four triangle faces aligned in the longitudinal direction of the strip.

According to the invention, said forming means includes molding rolls at least one of which has thereon a plurality of pyramid-shaped protrusions with four triangle faces to form said recesses in said strips.

It should be noted that said molding rolls are arranged side by side with a distance which is smaller than a thickness of the dough sheet, so that the pyramid-shaped recesses can be positively formed with a sufficiently large depth.

According to the invention, said pyramid-shaped protrusions on the molding roll are preferably shaped such that a vertical angle of an isosceles triangle formed by a vertical cross section passing through a top of the pyramid-shaped recess in the longitudinal direction of the noodle strip is set to an angle within a range from 45degrees to 90 degrees.

According to the invention, when a distance between adjacent pyramid-shaped protrusions viewed in a direction parallel with an axis of the molding roll is set to be equal to a distance between adjacent edges of cutter roll, there is formed a single row of pyramid-shaped recesses in each of strips. In this case, when both rolls have the pyramid-shaped protrusions, there are formed a row of pyramid-shaped recesses in each of the rolled surfaces of a strip. Furthermore, when a distance between adjacent pyramid-shaped protrusions viewed in the direction parallel with the axis of the molding roll is set to be a half of the distance between adjacent edge of cutter roll, there are formed two rows of pyramid-shaped recesses in one surface of a strip. Then, there are formed four rows of pyramid-shaped recesses in respective strip.

In order to attain the improved reconstitution, it is sufficient to provide the pyramid-shaped protrusions in a surface of one of the pair-wised rolls and the other roll may have a smooth surface, but in this case a great many pyramid-shaped recesses have to be formed. To this end, it is preferable to use a pair of molding rolls having the pyramid-shaped protrusions formed thereon. When a width of a strip is small such as 1 to 1.5 mm, the desired function can be attained by forming a single row of pyramid-shaped recesses. However, for a wide strip, a plurality of recess rows may be advantageously formed in parallel with each other. In this case, it is not always necessary to set a width of a strip to be equal to an integer multiple of a distance between adjacent pyramid-shaped recess rows. When the number of the recess rows in a strip is different from that of adjacent strips, there is preferably produced a delicate difference in edible feeling.

In the method and apparatus according to the invention, the pyramid-shaped recesses are formed by one or more molding rolls arranged just before the cutting means for cutting the dough sheet into strips, and thus any desired cutter may be used. For instance, a strip may have a circular cross section, a rectangular cross section or a rounded-off rectangular cross section.

Further the method and apparatus according to the invention can be performed by merely providing the molding rolls between the last rolling roll pair and the cutting section or by replacing the last rolling roll pair by the molding rolls. Therefore, it is not necessary to change largely the ordinary installation for manufacturing the oil-free non-fried instant noodles.

According to the invention, the pyramid-shaped protrusions are readily formed on the surface of the molding roll by longitudinal and peripheral v-shaped grooves. The protrusion is to be a rectangular pyramid but not necessary to be a square pyramid. However, only a portion of the pyramid-shaped protrusion is projected into the dough sheet, and thus if a difference between a long side and a short side of a bottom of a pyramid-shaped protrusion is large, a distance between adjacent pyramid-shaped recesses viewed in the axial direction of the molding roll or in the longitudinal direction of the strip becomes too large to form the recesses on a larger surface area of the dough sheet. Therefore, a ratio of the long side to the short side of the rectangle bottom of the pyramid-shaped protrusion is preferably set to about 1:1.

A distance between successive pyramid-shaped recesses viewed in the axial direction of the molding roll is substantially determined by a width of a strip to be formed. For instance, when a single row of recesses is to be formed on a strip having a width of 1 mm, said distance is preferably set to 1 mm.

A distance between successive recesses viewed in a rotational direction of the molding roll may be determined at will. However, if a vertical angle of a recess viewed on a vertical plane passing through a top of the recesses and being in parallel with a longitudinal direction of the noodle strip is small, in other words, if the recess have an acute vertical angle, the object of the present invention could not be attained as the needle roll stated above, so the dough sheet material is liable to stick onto the molding roll and a continuous production becomes impossible. Contrary to this, if the apex angle is too large, that is, if the recess have nearly flat pyramid shape, the dough sheet material is not liable to stick onto the roll, and thus the noodle strips could not be reconstituted efficiently within a short time. In order to attain the object of the present invention sufficiently, said vertical angle is preferably set to an angle within a range from 45 degrees to 90degrees.

In the instant noodle strip according to the invention, there are formed pyramid-shaped recesses, and thus a surface area is increased and a large amount of water can be absorbed into the strip. In this manner, the reconstituting time can be shortened. Moreover, during the rolling process, the dough is repeatedly rolled by means of a plural sets of rolls and thus a network microstructure of gluten is rolled in the longitudinal direction of the dough sheet. Even though the noodle strip is reconstituted, it has the microstructure in which is like chewing rubber. However, in the instant noodle according to the invention, the network microstructure of gluten is cut by forming the pyramid-shaped recesses in the dough sheet. Therefore, the instant noodle strip has a soft chewiness.

In the instant noodle strip according to the invention, the outer configuration of the strip is not affected by the presence of pyramid-shaped recesses as compared with the known instant noodle strips formed by the known methods stated above, and therefore the circular or rectangular or rounded-off rectangular cross section of the strip can be substantially maintained. Therefore, the strip according to the invention is felt to be smooth to the tongue. The surface of the strip is felt to be substantially smooth, while the strip can be efficiently reconstituted within a short time and can be well matched with soup.

DESCRIPTION OF THE PREFERRED EMBODIMENTS

Figure 1:
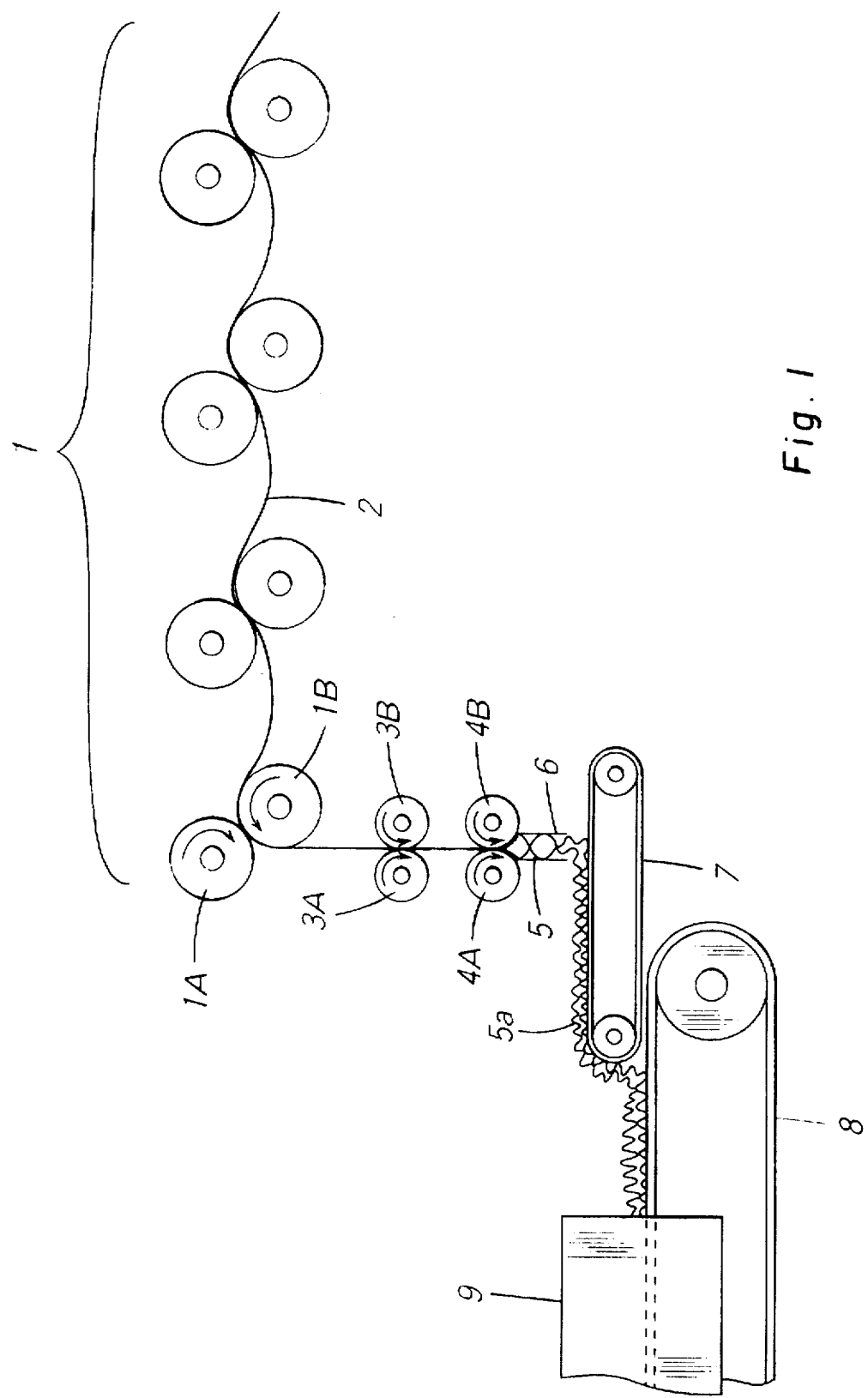
FIG. 1 is a schematic view showing an apparatus for performing the method of manufacturing the instant noodle strip according to the invention.
Figure 2:
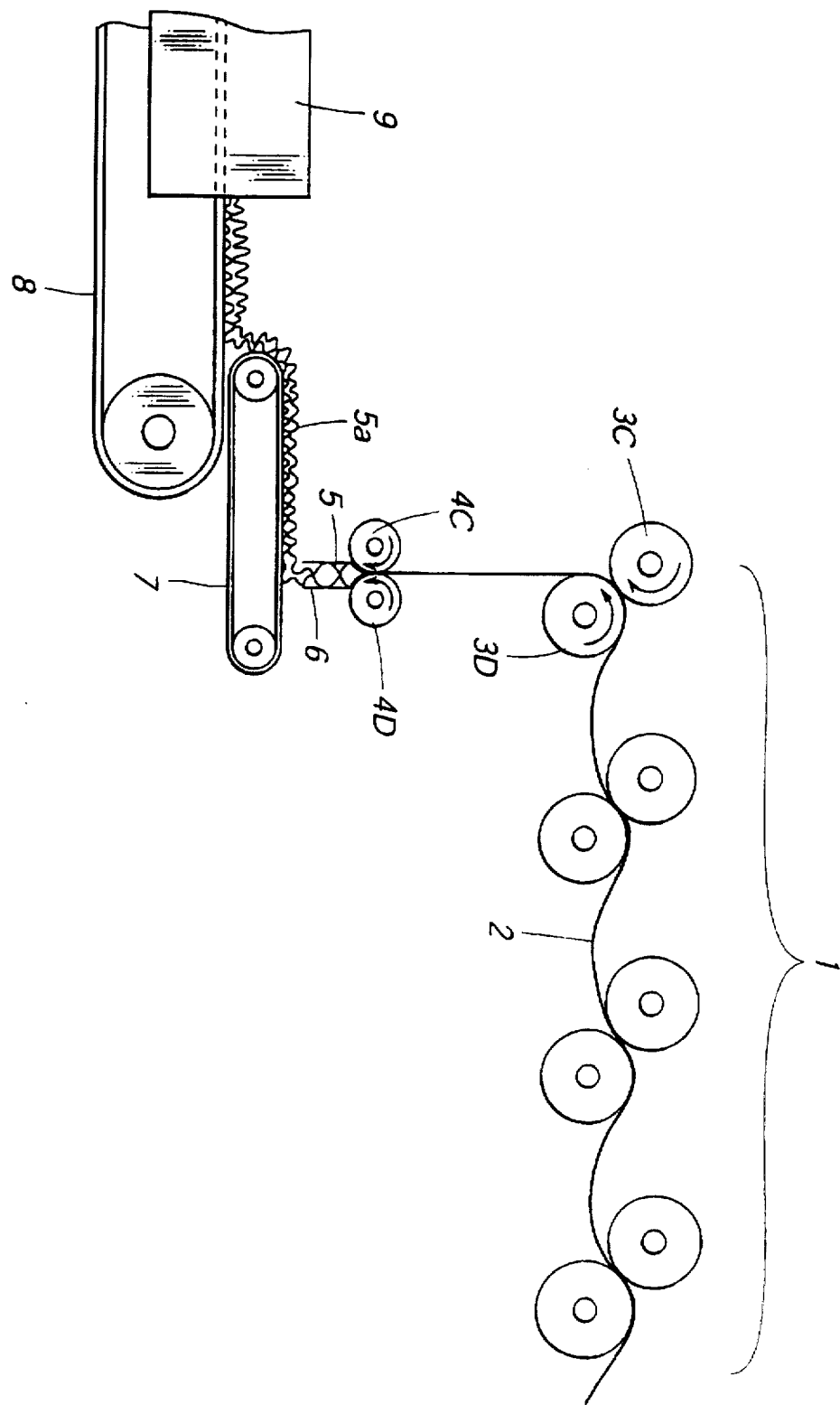
FIG. 2 is a schematic view illustrating an apparatus for carrying out the method of manufacturing the instant noodle strip according to the invention.

FIG. 1 is a schematic view showing an embodiment of an apparatus for manufacturing instant noodle strip according to the invention, in which a pair of molding rolls are provided between the last pair of rolls of a multistage rolling device and a cutting device. FIG. 2 is a schematic view illustrating another embodiment of the apparatus for manufacturing instant noodle strip according to the invention, in which the last pair of rolls of the multistage rolling device are formed by molding rolls. In FIG. 1, a dough obtained by kneading wheat flour together with water or water containing additives is supplied to a rolling device 1. In the present embodiment, the rolling device 1 is formed by a known multistage rolling device including plural pairs of rolls. Then, number of stages of the multistage rolling device 1 may be three to five. In this respect, a reference could be made to Japanese encyclopedia of noodles, pages 237 and 238, published on Jan. 26, 1984 from Japanese company, Shokuhin Shuppan Sha. By means of the rolling device 1, there is formed a dough sheet 2. The dough sheet 2 is supplied from the last pair of rolls 1A and 1B into a pair of molding rolls 3A and 3B. On outer surfaces of the molding rolls 3A and 3B there are formed a number of pyramid-shaped protrusions, and therefore corresponding pyramid-shaped recesses are formed in both rolled surfaces of the dough sheet 2. The distance between the molding rolls 3A and 3B is controlled by a device not shown, so that the pyramid-shaped recesses may be formed with a suitable depth. Then, the dough sheet 2 having the pyramid-shaped recesses formed therein is supplied to cutting rolls 4A and 4B and is split into a plurality of strips 5. The strips 5 are then supplied to a wave forming device 6 and are converted into strips 5a having wave. The thus treated strips 6 are further supplied by means of conveyor belts 7 and 8 into a boiling device 9.

Figure 3:
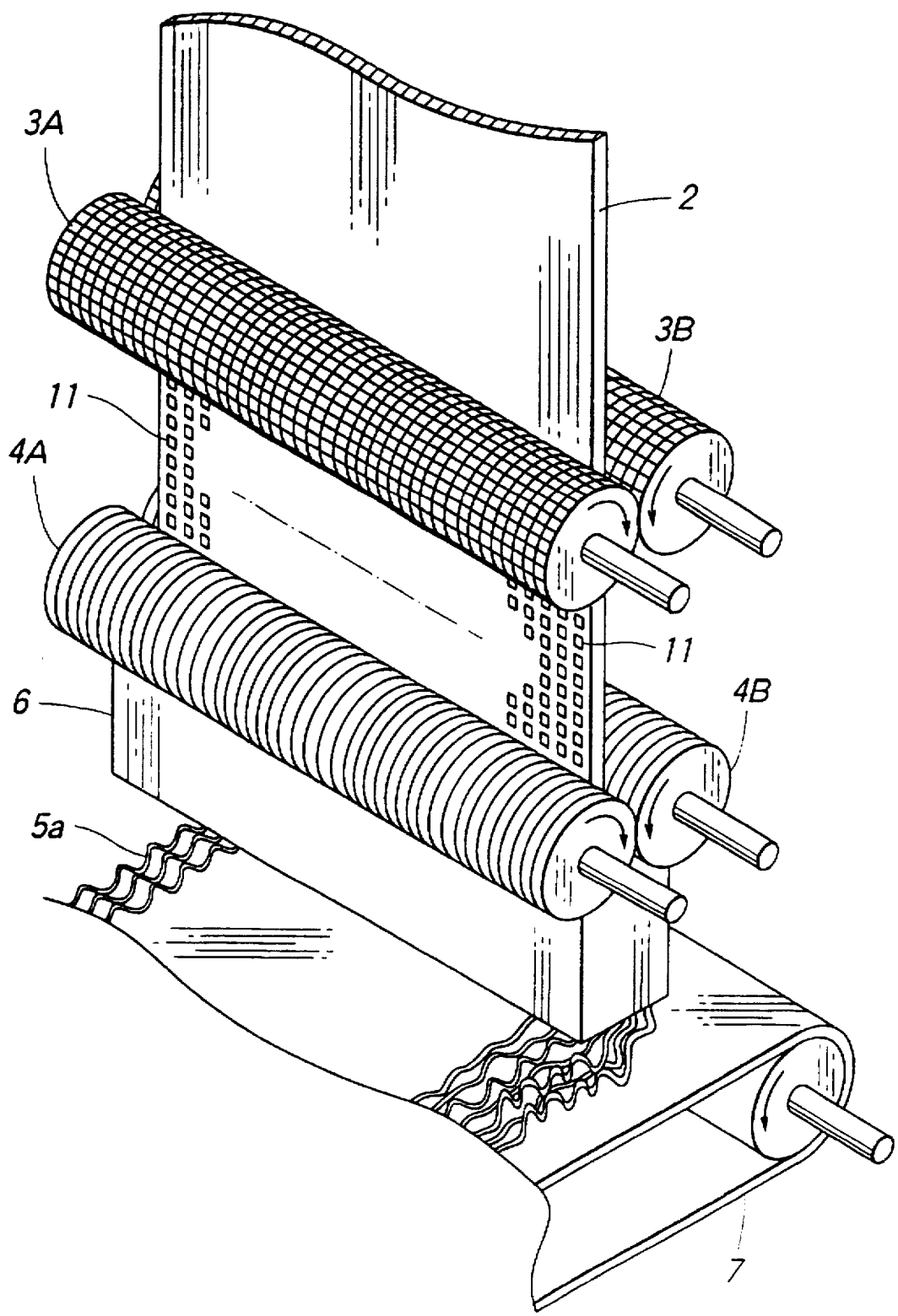
FIG. 3 is a perspective view depicting a part of the apparatus shown in FIG. 1 for forming recesses in a dough sheet.
Figure 4:
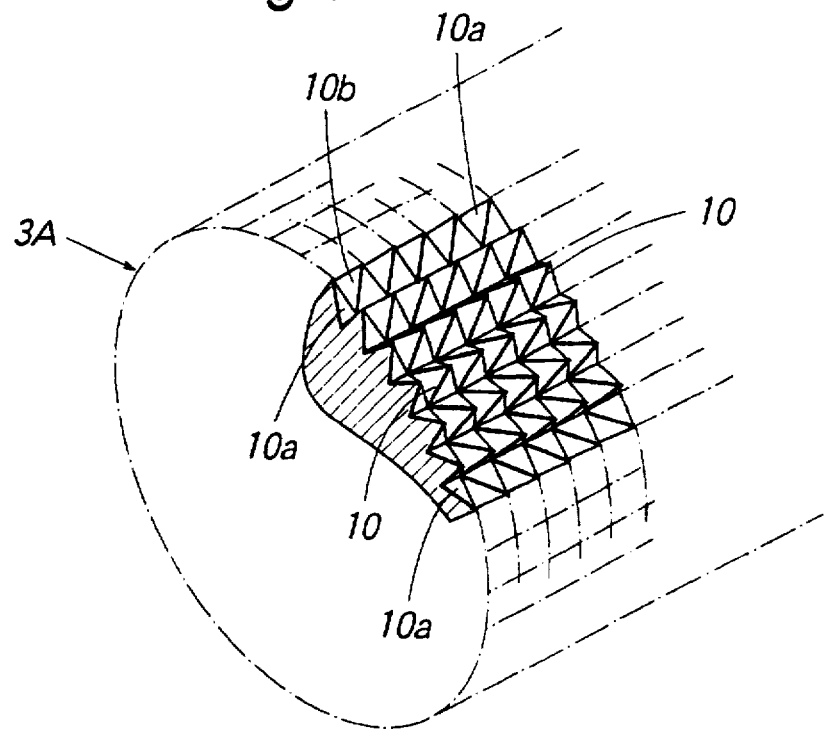
FIG. 4 is a perspective view, on an enlarged scale, of a portion of a molding roll.
Figure 5:
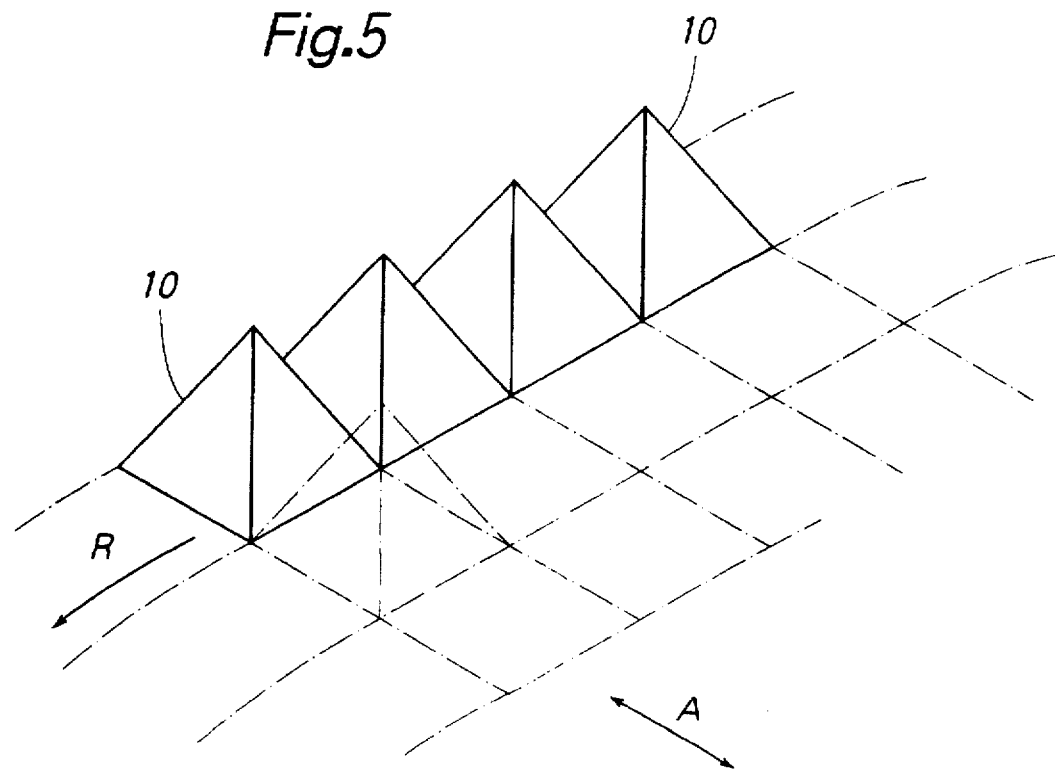
FIG. 5 is a schematic view showing a part of a molding roll at an enlarged scale.

FIG. 3 shows the operation of the molding rolls 3A and 3B and cutting rolls 4A and 4B, and FIG. 4 shows a part of the molding rolls 3A on an enlarged scale. On the molding rolls 3A and 3B there are formed a number of rectangular pyramid-shaped protrusions 10, which are formed by longitudinal v-shaped grooves 10a and peripheral v-shaped grooves 10b. It should be understood that the protrusions 10 may be in the form of a polyhedron or a cone, but a rectangle bottom face is preferable for the purpose of easy formation. When the dough sheet 2 passes between the molding rolls 3A and 3B, a number of pyramid-shaped recesses 11 are formed in the surfaces of the dough sheet. FIG. 5 shows protrusions 10 provided on the surfaces of the molding rolls 3A and 3B. In FIG. 5, a rotational direction of the molding roll is shown by an arrow R and an axial direction of the molding roll is denoted by an arrow A.

FIG. 2 is a schematic view depicting another embodiment of the apparatus of manufacturing the instant noodle according to the invention. In the embodiment shown in FIG. 1, the molding rolls 3A and 3B are arranged between the last pair of rolls 1A and 1B of rolling device 1 and the cutting rolls 4A and 4B. In the embodiment illustrated in FIG. 2, the last stage rolls of the rolling device 1 are formed by molding rolls 3C and 3D.

Figure 6:
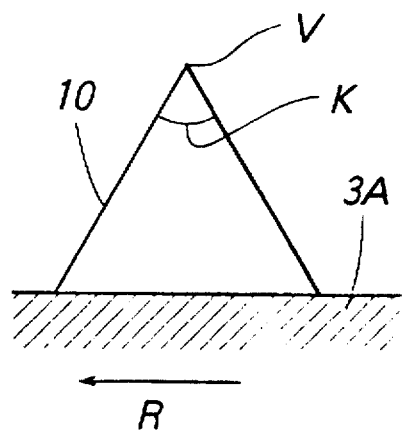
FIG. 6 is a schematic view explaining a vertical angle of an isosceles triangle of a pyramid-shape protrusion.

FIG. 6 shows a vertical cross sectional view of a pyramid-shaped protrusion 10 cut along a plane which is parallel with the rotational direction R of the molding roll 3A and 3B, and passes through a vertex V of the pyramid-shaped protrusion. The vertical cross section is an isosceles triangle having a vertical angle K. According to the invention, it has been experimentally confirmed that said vertical angle K is preferably set to a value within a range from 45 degrees to 90 degrees in order to obtain an improved reconstituting property.

Figure 7:
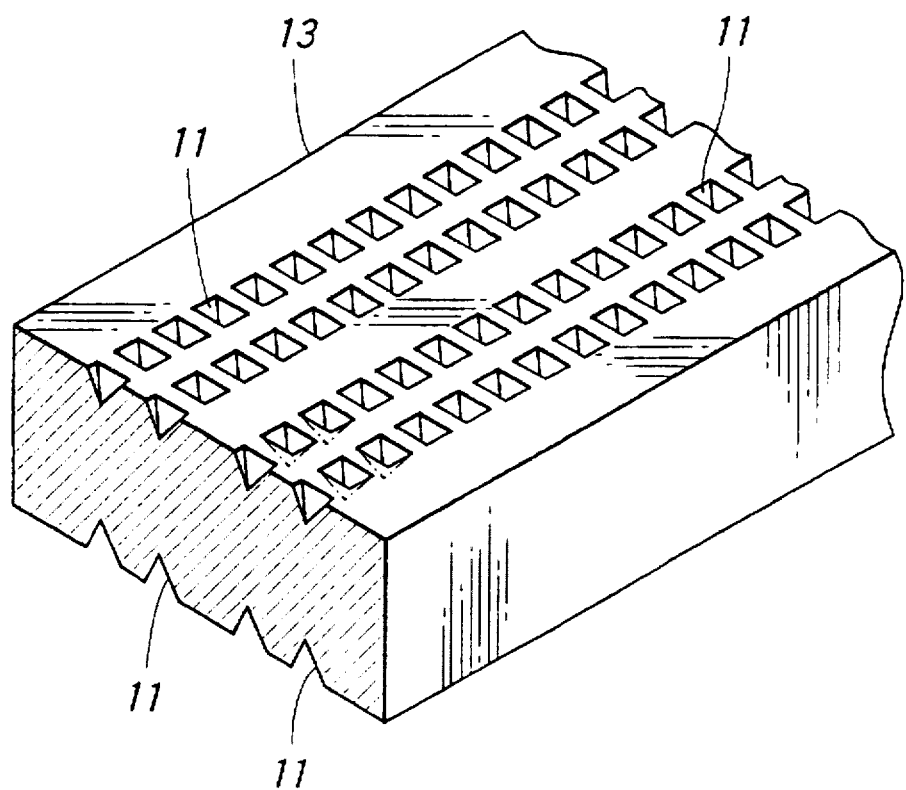
FIG. 7 is a partially cross sectional perspective view depicting an instant noodle strip having a wide width according to the invention.

FIG. 7 illustrates another noodle strip 13 obtained by cutting the dough sheet 2 having the pyramid-recesses 11 formed thereon. The noodle strip 13 has a rather wide width and having a rectangular cross section. In each of upper and lower surfaces of the strip, there are formed four rows of pyramid-shaped recesses 11.

Figure 8:
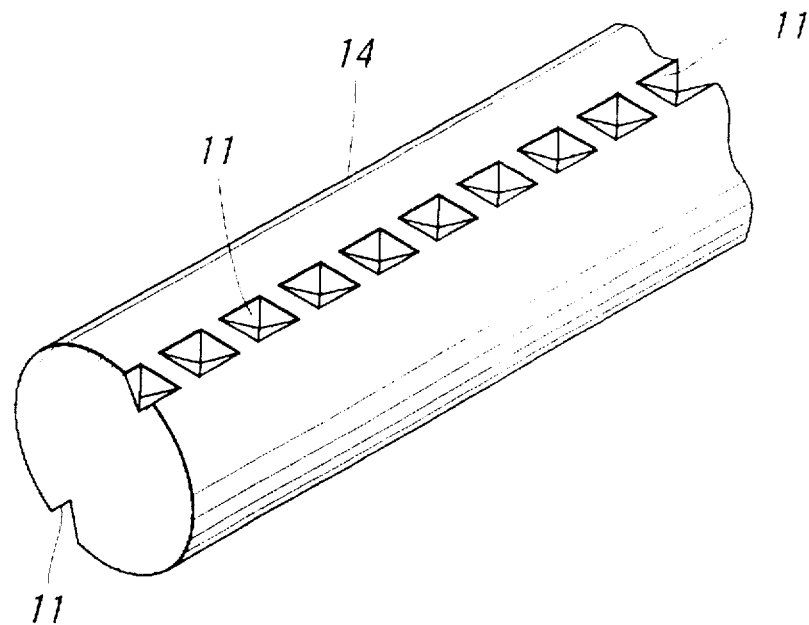
FIG. 8 is a partially cross sectional perspective view showing an instant noodle strip having a circular cross section according to the invention.

FIG. 8 shows still another noodle strip 14 according to the invention. In the present embodiment, the strip 14 has a circular cross section and two rows of pyramid-shaped recesses 11 are formed at diametrically opposed positions.

Now several examples of the instant noodle strips according to the invention will be explained together with comparative examples.

EXAMPLE 1

Wheat flour of 100 weight part was mixed with KANSUI of 0.5 weight part, common salt of 1 weight part, food color of gardenia of 0.1 weight part and water of 40 weight part. KANSUI is an alkaline additive in solid or aqueous solution form containing one or more salts such as sodium carbonate, potassium carbonate and the like. A mixture was kneaded well to form a dough. Then, the dough was rolled by the rolling device in a manner to produce a dough sheet having a thickness of 1.3 mm. Next, the dough sheet was passed through a pair of molding rolls having the pyramid-shaped protrusions formed thereon. The vertical angle K of a pyramid-shaped protrusion was set to 45 degrees and a distance between vertices of adjacent protrusions aligned in the axial direction as well as in the rotational direction of the roll was set to 0.75 mm. The molding rolls were separated from each other by 0.5 mm. Therefore, in both surfaces of the dough sheet, there were formed a number of pyramid-shaped recesses aligned regularly in a longitudinal direction as well as in a lateral direction such that a distance between vertices of adjacent recesses was 0.75 mm. Then, the dough sheet was cut into strips by means of the cutting rolls having cutting edges of No. 20 (1.5 mm width). Each strip had a thickness of 1.4 mm and had four rows of pyramid-shaped recesses, two rows being formed in one of two rolled surfaces between cut surfaces and two rows being formed in the other rolled surfaces. Next, the strips were steamed, and then were dried with a hot air of 90 degrees centigrade. In this manner, hot air dried instant noodles containing water of 10 weight % were obtained.

Comparative Example 1

The dough sheet obtained by the same process as the above mentioned example 1 was cut into strips by means of the No. 20 cutting edges without passing through the molding rolls. In this manner, the noodle strips having a thickness of 1.4 mm were obtained. After steaming, they were dried by hot air to obtain instant noodles containing water by 10 weight %.

Figure 9:
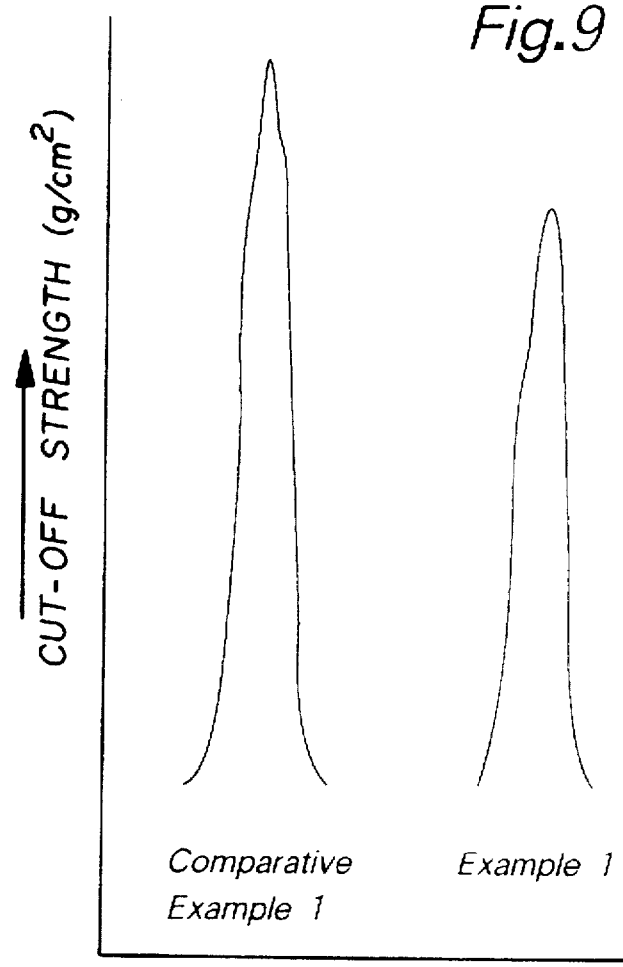
FIG. 9 is a graph formed by a rheoplotter based on data obtained by a rheometer.

The instant noodles obtained by the example 1 and comparative example 1 were boiled in hot water of 500 ml for three minutes, and then soup was added. Sensory test was conducted for the resulted noodles by five panelists. Result of this test is shown in a Table 1. The noodle strips were also tested by means of a rheometer for measuring a cut-off strength. Result of this test is shown in Table 2. Further the instant noodles were immersed in hot water and an amount of water absorbed in the noodles was measured. Result of this test is shown in Table 3. FIG. 9 represents a graph obtained by a rheoplotter, which plots data a rheometer generates, on the basis of the data shown in the Table 2.

TABLE 1

SENSORY TEST

| | Example 1 | Comparative Example 1 |
| --- | --- | --- |
| Estimation | transparent appearance, voluminous, smooth to tongue, soft like as fresh noodle, well matching with soup | transparent appearance, but microstructure is like chewing tough rubber, hard core existent and poor matching with soup |

TABLE 2

CUT-OFF STRENGTH MEASURED BY RHEOMETER

| | Example 1 | Comparative Example 1 |
| --- | --- | --- |
| Cut-off Strength | 1013 g/cm$^2$ | 1275 g/cm$^2$ |

TABLE 3

WATER ABSORBING TEST

| | noodle weight prior to addition of hot water | noodle weight 3 minutes after addition of hot water | weight of absorbed hot water |
| --- | --- | --- | --- |
| Example 1 | 70 g | 169 g | 99 g |
| Comparative Example 1 | 70 g | 155 g | 85 g |

The test with the aid of the rheometer was conducted under the following conditions:

Rheometer: Fudo Rheometer, Model RT-2010J-CW (manufactured by LEOTECH)

Measuring Adapter: piano wire (cut-off strength measurement)

Extracted Time: one minute (time from end of preparation to a measurement)

Cutting Speed: 2 cm per minute (speed of cutting a sample noodle by the piano wire by ascending a sample stage)

Number of Noodles: four (the number of noodles placed on the sample stage at one time)

Measured Item: cutting-off strength

As can be understood from the graph shown in FIG. 9, a peak becomes high as a cooked noodle is tough, and when a hard core exists, a sharp peak having an acute angle is obtained when the noodle is cut.

As can be seen from the Table 1 representing the result of the sensory test, the instant noodle according to the example 1 of the invention has improved reconstitution, gives smooth feeling to the tongue, well matches with soup and don't get bored with customers. Further, the noodle has texture which is not like chewing tough rubber, but gives good chewiness.

From the result of the cutting-off strength test shown in the Table 2 with the rheometer, the noodle of the example 1 has a soft chewiness much more than the noodles of the comparative example 1.

Judging from the test result shown in the Table 3, the noodle according to the example 1 has an improved reconstituting property as compared with the noodles of the comparative example 1.

From the graph shown in FIG. 9, it can be understood that the noodle of the example 1 is softer than the noodle of the comparative example 1. The noodle of the comparative example 1 is tough and a hard core existent even after one minute from an end of the three minutes preparation.

EXAMPLE 2

Wheat flour of 90 weight part was mixed with potato starch of 10 weight part, KANSUI of 0.5 weight part, common salt of 1 weight part, food color of gardenia of 0.1 weight part and water of 40 weight part. A mixture was kneaded well to form a dough. Then, the dough was rolled by the rolling device in a manner to produce a dough sheet having a thickness of 1.1 mm. Next, the dough sheet was passed through a pair of molding rolls having the pyramid-shaped protrusions formed thereon. The vertical angle K of a pyramid-shaped protrusion was set to 90 degrees. The molding rolls were separated from each other by 0.3 mm. Then, the dough sheet was cut into strips by the cutting rolls having cutting edges of No. 20 (1.5 mm width). Each strip had a thickness of 1.2 mm. Next, the strips were steamed, and then were dried with a hot air of 90 degrees centigrade.

In this manner, hot air dried instant noodles containing water of 10 weight % were obtained.

EXAMPLE 3

In this example, the dough sheet was treated by molding rolls having pyramid-shaped protrusions having the vertical angle K of 60 degrees. The remaining conditions were identical with those of the example 2.

EXAMPLE 4

The dough sheet was passed between molding rolls having pyramid-shaped protrusions having the vertical angle K of 45 degrees. The remaining conditions were same as those of the example 2.

Comparative Example 2

The dough sheet was formed by the same process as the example 2 except for a point that the dough sheet was not passed through the molding rolls. After cutting the dough sheet into noodle strips, they were treated by the same process as the example 2 to obtain instant noodles.

Comparative Example 3

The dough sheet was formed by the same process as the example 2 except for a point the dough sheet was passed between molding rolls having pyramid-shaped protrusions formed thereon, said protrusion having the vertical angle K of 120 degrees. The remaining manufacturing process was entirely same as the example 2.

Comparative Example 4

The dough sheet was passed between molding rolls having pyramid-shaped protrusions formed thereon, the protrusion having the vertical angle K of 30 degrees. Then, material of the dough sheet stuck on the molding rolls, so that noodle strips could not be formed.

Figure 10:
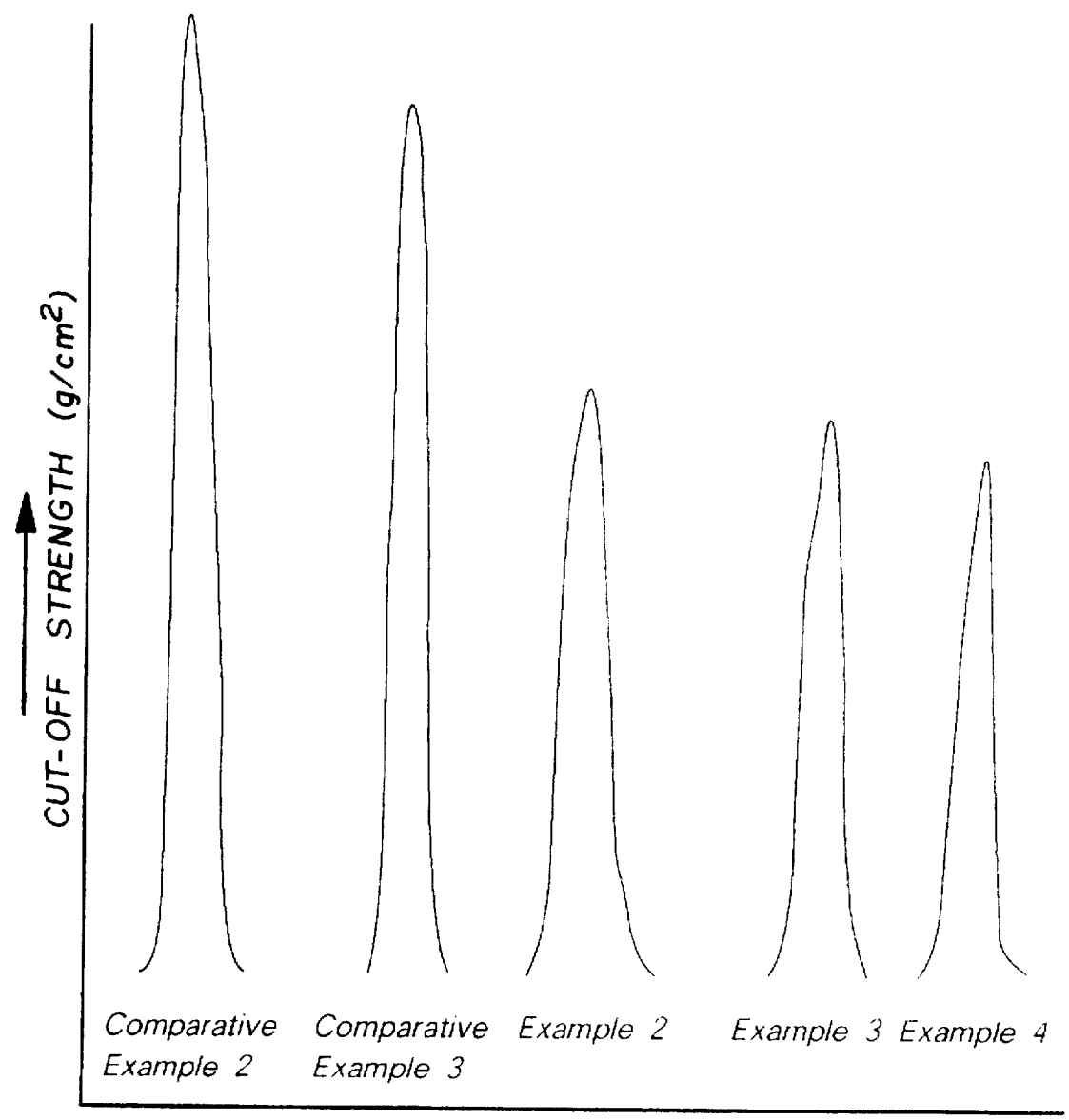
FIG. 10 is graphs formed by a rheoplotter based on cut test data obtained by a rheometer.

The instant noodles obtained by the examples 2, 3 and 4 and comparative examples 2 and 3 were boiled in hot water of 500 ml for three minutes, and then soup was added. Sensory test was conducted for the resulted noodles by five panelists. Result of this test is shown in a Table 4. The noodle strips were also tested by means of a rheometer for measuring a cut-off strength. Result of this test is shown in Table 5. Further the instant noodles were immersed in hot water and an amount of water absorbed in the noodles was measured. Result of this test is shown in Table 6. FIG. 10 shows a graph obtained by a rheoplotter on the basis of the data shown in the Table 5.

TABLE 4

| SENSORY TEST | |
|---|---|
| | Estimation |
| Comparative Example 2 | like chewing very tough rubber and poor matching with soup |
| Comparative Example 3 | like chewing tough rubber and poor matching with soup |
| Example 2 | soft like as fresh noodle and smooth to tongue, well matching with soup |
| Example 3 | soft like as fresh noodle and smooth to tongue, well matching with soup |
| Example 4 | soft like as fresh noodle and smooth to tongue, well matching with soup |

TABLE 5

| CUT-OFF STRENGTH MEASURED BY RHEOMETER | | | | | |
|---|---|---|---|---|---|
| | Comparative Example 2 | Comparative Example 3 | Example 2 | Example 3 | Example 4 |
| Angle (Note: 1) | Non (Note: 2) | 120 degrees | 90 degrees | 60 degrees | 45 degrees |
| Cut-off Strength | 1915 g/cm$^2$ | 1723 g/cm$^2$ | 1150 g/cm$^2$ | 1088 g/cm$^2$ | 1002 g/cm$^2$ |

Note: 1 Vertical angle K of isosceles triangle on a vertical plane passing through a vertex of pyramid-shaped recess.
Note: 2 molding roll was not used.

TABLE 6

| WATER ABSORBING TEST | | | | |
|---|---|---|---|---|
| | angle (Note: 1) | noodle weight prior to addition of hot water | noodle weight 3 minutes after addition of hot water | weight of absorbed hot water |
| Comparative Example 2 | None (Note: 2) | 70 g | 156 g | 86 g |
| Comparative Example 3 | 120 degrees | 70 g | 157 g | 87 g |
| Example 2 | 90 degrees | 70 g | 163 g | 93 g |
| Example 3 | 60 degrees | 70 g | 168 g | 98 g |
| Example 4 | 45 degrees | 70 g | 166 g | 96 g |

Note: 1 Vertical angle K of isosceles triangle on a vertical plane passing through a vertex of pyramid-shaped recess
Note: 2 molding roll was not used.

As can be understood from the Tables 4 and 5, the instant noodles according to the examples 2 to 4 of the invention, in which the dough sheet was passed through the molding rolls having the pyramid-shaped protrusions having the vertical angle K of 45 degrees to 90 degrees, have improved reconstituting property, give smooth feeling to a tongue, well matche with soup and never bore the consumers with the taste. Further, the noodles have texture which is not like chewing tough rubber, but gives good chewiness.

From the test result shown in the Table 5, it is apparent that the instant noodles of the examples 2 to 4 according to the invention give soft chewiness much more than the instant noodles of the comparative examples 2 and 3.

Furthermore, the test result represented in the Table 6 shows that the instant noodles of the examples 2 to 4 according to the invention can be well reconstituted with hot water as compared with the instant noodles of the comparative examples 2 and 3.

From the graph illustrated in FIG. 10, one can understand that the instant noodles of the examples 2 to 4 are soft, while the instant noodles of the comparative examples 2 and 3 are tough.

The merits of the present invention may be summarized as follows:

(1) The instant noodle strips according to the invention has a better reconstituting property and can be prepared much more conveniently than the known noodles.

(2) The instant noodle according to the invention gives soft and smooth feeling to a tongue.

(3) The instant noodle according to the invention can be reconstituted in a voluminous feeling.

(4) The instant noodle according to the invention can resolve one of the problems of conventional non-fried noodles by matching well with soup and never boring the eaters with its taste.

(5) The method according to the invention can be performed without big changing the existent installation, so that manufacturing cost is not increased so much.

(6) In the method according to the invention, it is possible to manufacture the instant noodles having the above mentioned merits easily, while a cross sectional shape of the noodle can be circular, rectangular and round-off rectangular.

(7) In the apparatus according to the invention, it is possible to form pyramid-shaped protrusions of molding rolls readily, so manufacturing cost is not increased so much.

What is claimed is:

1. A method of manufacturing instant noodle strips comprising the steps of:

kneading wheat flour together with water or water containing additives to form a dough:

rolling the dough to form a dough sheet;

passing the dough sheet between molding rolls, at least one of which forms thereon a plurality of pyramid-shaped protrusions to form pyramid-shaped recesses with four triangle faces in at least one of two rolled surfaces of the dough sheet; and cutting the dough sheet into a plurality of strips such that each of the strips forms therein at least one row of pyramid-shaped recesses aligned in a longitudinal direction of the strip.

2. A method according to claim 1, wherein said dough sheet is passed between said molding rolls which are arranged side by side with a distance smaller than a thickness of the dough sheet.

3. A method according to claim 1, wherein said pyramid-shaped protrusions on the molding roll are shaped such that a vertical angle of an isosceles triangle formed by a vertical cross section passing through a top of the pyramid-shaped recess in a longitudinal direction of the noodle strip is set to an angle within a range from 45 degrees to 90 degrees.

4. A method of manufacturing instant noodles comprising the steps of:

kneading wheat flour together with water or water containing additives to form a dough:

rolling the dough to form a dough sheet;

passing the dough sheet between molding rolls, at least one of which forms thereon a plurality of pyramid-shaped protrusions to form pyramid-shaped recesses with four triangle faces in at least one of two rolled surfaces of the dough sheet;

cutting the dough sheet into a plurality of strips such that each of the strips forms therein at least one row of pyramid-shaped recesses aligned in a longitudinal direction of the strip;

steaming said instant noodle strips; and drying the steamed noodle strips with hot air to obtain non-fried instant noodles.

5. A method according to claim 4, wherein said dough sheet is passed between said molding rolls which are arranged side by side with a distance smaller than a thickness of the dough sheet.

6. A method according to claim 4, wherein said pyramid-shaped protrusions on the molding roll are shaped such that a vertical angle of an isosceles triangle formed by a vertical cross section passing through a top of the pyramid-shaped recess in a longitudinal direction of the noodle strip is set to an angle within a range from 45 degrees to 90 degrees.

7. A method according to claim 4, wherein said steaming step is performed with projecting steam onto the instant noodle strips.

8. A method according to claim 4, wherein after cutting the dough sheet into the instant noodle strips, the noodle strips are subjected to a wave forming step.

* * * * *